United States Patent
Wang (10) Patent No.: US 12,086,090 B2
(45) Date of Patent: Sep. 10, 2024

(54) UNIFORM VIRTUAL BUS FOR SYSTEM-TO-SYSTEM CONNECTIVITY IN AN AUTONOMOUS DRIVING VEHICLE

(71) Applicant: Apollo Autonomous Driving USA LLC, Sunnyvale, CA (US)

(72) Inventor: Qiang Wang, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 15 days.

(21) Appl. No.: 18/147,456

(22) Filed: Dec. 28, 2022

(65) Prior Publication Data

US 2024/0220437 A1      Jul. 4, 2024

(51) Int. Cl.
   *G06F 13/40*      (2006.01)
   *G06F 13/42*      (2006.01)

(52) U.S. Cl.
   CPC ...... *G06F 13/4027* (2013.01); *G06F 13/4282* (2013.01); *G06F 2213/0016* (2013.01); *G06F 2213/0026* (2013.01)

(58) Field of Classification Search
   CPC ............. G06F 13/4027; G06F 13/4282; G06F 2213/0016; G06F 2213/0026
   See application file for complete search history.

(56) References Cited

U.S. PATENT DOCUMENTS

| | | | |
|---|---|---|---|
| 9,170,952 B1* | 10/2015 | Vijayaraghavan | ............................ G06F 12/0862 |
| 11,115,025 B2* | 9/2021 | Shumarayev | ....... G06F 13/4282 |
| 11,379,389 B1* | 7/2022 | Noguera Serra | ... G06F 13/1663 |
| 2018/0121280 A1* | 5/2018 | Sanders | .............. G06F 11/0736 |
| 2019/0326210 A1* | 10/2019 | Teh | ........................ H01L 23/528 |
| 2022/0187795 A1* | 6/2022 | Smith | ................. G06F 11/3013 |
| 2023/0063062 A1* | 3/2023 | Srinivasan | ............. H04N 19/12 |
| 2023/0143302 A1* | 5/2023 | Chopperla | ................ G06F 1/12 713/100 |

* cited by examiner

*Primary Examiner* — Henry Tsai
*Assistant Examiner* — Christopher A Daley
(74) *Attorney, Agent, or Firm* — WOMBLE BOND DICKINSON (US) LLP (57) ABSTRACT

A distributed computing system in an autonomous driving vehicle (ADV) includes a main compute system and multiple subsystems, and a bus structure that connect the main compute system and the multiple subsystems. The bus structure provides uniform system-to-system connectivity. A host field-programmable gate array (FPGA) agent coupled to the main compute system can communicate with slave FPGA agents on the subsystems via multiple pairs of bus interface protocols of a particular type. The bus interfaces on the FPGA agents supports the uniform system-to-system connectivity.

20 Claims, 10 Drawing Sheets

UNIFORM VIRTUAL BUS FOR SYSTEM-TO-SYSTEM CONNECTIVITY IN AN AUTONOMOUS DRIVING VEHICLE

TECHNICAL FIELD

Embodiments of the present disclosure relate generally to autonomous driving vehicles. More particularly, embodiments of the disclosure relate to a distributed computing system with uniform virtual bus connectivity in an autonomous driving vehicle.

BACKGROUND

An autonomous driving vehicle (ADV) is a vehicle that operates in an autonomous mode (e.g., driverless), and that can relieve occupants, especially the driver, from some driving-related responsibilities. With the level of automation increasing in an ADV, the computing system that powers the automation has also increased in complexity, and thus a distributed computing system is often needed.

A system-to-system connectivity in the distributed computing system can be established using different wires and buses with different interfaces, such as Ethernet, peripheral component interconnect express (PCIe), serial peripheral interface (SPI), inter-integrated circuit (I2C), and universal asynchronous receiver-transmitter (UART). However, such a distributed computing system tends to take a great amount of board space, and may also be difficult to deploy and difficult to diagnose for errors.

For practical deployment of a distributed computing system on a moving ADV, less physical wires are desired because less wires can provide connection stability and wire simplicity, which is vital to the design of the ADV.

Previous attempts to solve the problem include using one bus interface (e.g., Ethernet-only interface design). The solution has many drawbacks, such as low data transfer efficiency for large raw sensors data, different adaptors to interface the devices that do not have an Ethernet port, and difficulty in preserving some precise time information needed for synchronization of subsystems in ADV applications.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, the disclosure describes a distributed vehicle computing system that comprises a main compute system and multiple subsystems, and a bus structure that provides uniform system-to-system connectivity. The bus structure comprises the same type of high-speed serial physical links between the main compute system and each of subsystem. A host field-programmable gate array (FPGA) agent coupled to the main compute system can communicate with slave FPGA agents on the subsystems via multiple pairs of bus interfaces of the same type.

In an embodiment, the slave FPGA agent on each subsystem can aggregate different interface signals, and then use the slave FPGA agent to make point-to-point interconnections with the host FPGA agent for information exchanges. Each of the host FPGA agent and the slave FPGA agents can act as a bus-agent. The host FPGA agent can provide bus interfaces of the same type (although they can be different variations/versions of the same type of bus interface) to facilitate connections to the subsystems, which are configured to perform different functions. The bus interfaces of the same type on the host FPGA agent and the slave FPGA agents enables the use of uniform high-speed serial links between the host FPGA agent and the slave FPGA agents. The high-speed serial links can provide huge amounts of data bandwidth with simple physical connectivity, and support synchronization of multiple systems without the use of extra synchronization channels.

In an embodiment, the distributed computing system comprises: a host FPGA agent coupled to a main compute system; multiple slave FPGA agents that each reside on a subsystem. The system further includes multiple pairs of bus interfaces that each are of a first type, with one bus interface of each pair of bus interfaces residing on the host FPGA agent, and the other residing on one of the slave FPGA agents. Each slave FPGA agent can include one or more logic blocks programmed to perform one or customized functions, and is linked to the host FPGA agent via a high-speed physical serial link.

In an embodiment, each the bus interface of the first type is one of an advanced extensible interface (AXI) or an Avalon interface. The high-speed physical serial link can be one of a high-speed cable or a high-speed fiber link that supports channel combination and clock recovery.

In an embodiment, the main compute system can be coupled to the host FPGA agent through a high-speed serial bus link, such as a PCIe link. The host FPGA agent includes a logic block configured to connect to the PCIe link and coupled to a PCIe bridge wrapper to offload data-moving tasks from the main compute system to the host FPGA agent. The host FPGA agent further includes an interconnector that bridges the bus interfaces on the host FPGA agent (i.e., the first bus interface of each of the plurality of pairs of bus interfaces) and the PCIe bridge wrapper.

In an embodiment, the slave FPGA agent on a first subsystem of the subsystems can be an Input/Output (I/O) extender, which is connected to multiple low-speed devices with different types of low-speed bus interfaces. The different types of low-speed bus interfaces include a SPI bus interface, an I2C bus interface, and a UART bus interface In an embodiment, the I/O extender includes multiple bus interface adaptors programmed to adapt the different types of low-speed bus interfaces to a light version of the bus interface of the first type. The I/O extender further includes an interconnector, which is programmed to converts light versions of the bus interface of the first type into a different version of the bus interface of the first type, e.g., chip2chip interface.

In an embodiment, the slave FPGA agent on a second subsystem of the subsystems can be a storage box, which includes a light version of the bus interface of the first type and a standard version of the bus interface of the first type. The light version and the standard version can both be converted to the second bus interface of the pair of bus interfaces corresponding to the storage box. On the storage box, the light version of the bus interface of the first type can be used to transmit control data, and the standard version of the bus interface of the first type can be used to transmit compressed video data.

In an embodiment, the slave FPGA agent on a third subsystem of the subsystems is a video codec accelerator, which includes a stream bus interface of the bus interface of the first type. The stream bus interface support parallel high-speed physical serial links.

The above summary does not include an exhaustive list of all aspects of the present invention. It is contemplated that the invention includes all devices, computer media, and methods that can be practiced from all suitable combinations of the various aspects summarized above, and also those disclosed in the Detailed Description below.

Further, the disclosure uses a particular bus interface protocol (e.g., AXI and PCIe) as example to illustrate the various embodiments of the invention. However, these illustrations are not limiting. A person skilled in the art would appreciate that other protocols may also be used in actual implementations.

Figure 1:
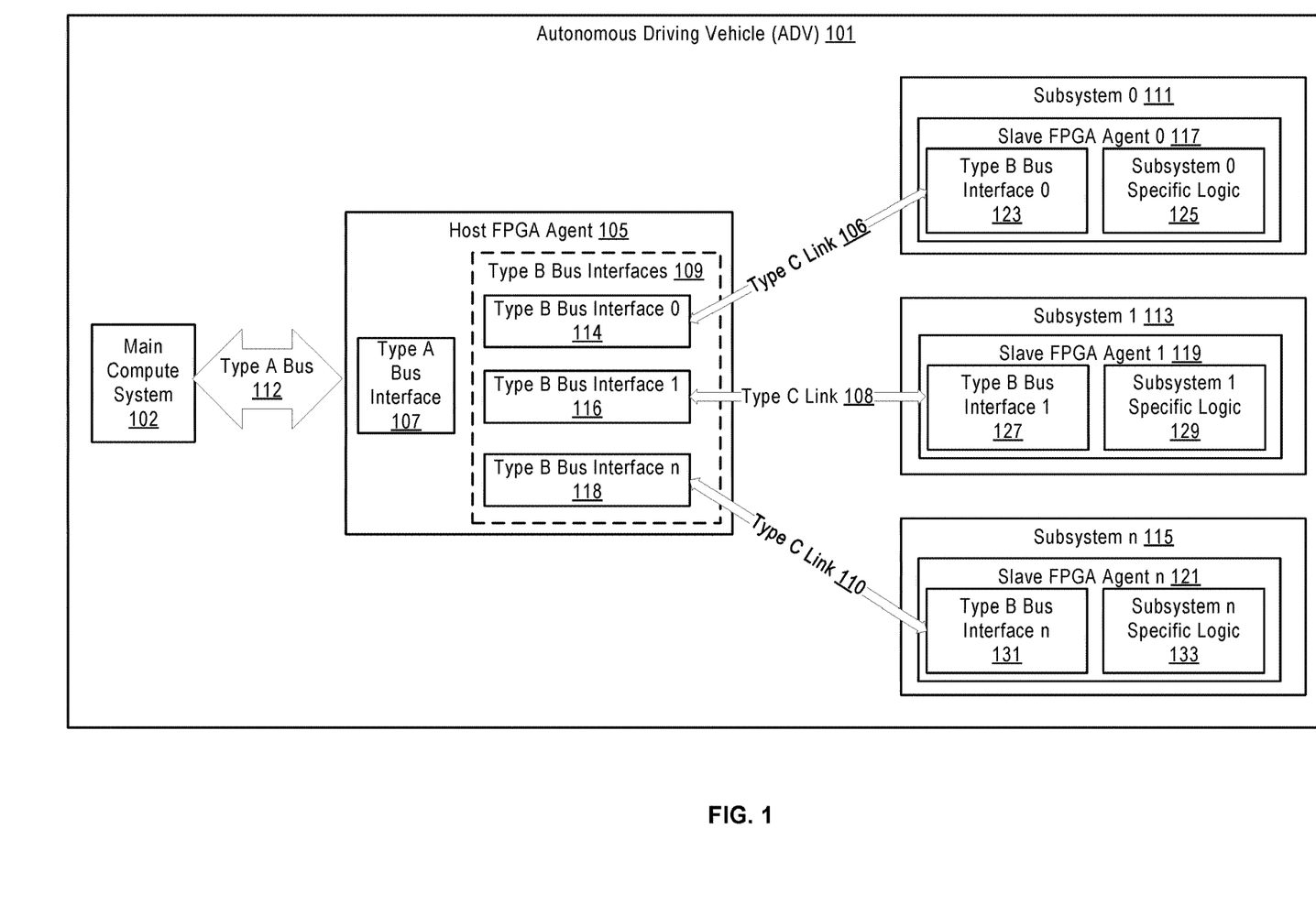
FIG. 1 illustrates a distributed computing system with a universal virtual bus in an ADV according to an embodiment of the invention.

FIG. 1 illustrates a distributed computing system with a universal virtual bus in an ADV 101 according to an embodiment of the invention. As shown in the figure, the distributed computing system can include a main compute system 102 that wherein the autonomous driving system of the ADV 101 is running. While the ADV 101 is travelling on a road, the ADS, which include a number of modules that perform functions such as perception, and trajectory planning, can be used to operate the ADV 101. While the ADV 101 is in motion, data such as sensor data and logging data need to be analyzed, transmitted, and stored to a remote location.

The distributed computing system in this embodiment is provided to meet the resource requirements of the above-mentioned tasks. The distributed computing system can include a main compute system 102, and multiple subsystems 111,113, and 115 that each perform one or more tasks offloaded from the main compute system. To reduce the complexity of wirings between the main compute system 102 and the subsystems 111, 113, and 115, a universal bus structure is used in the distributed computing system.

In an embodiment, the universal bus structure includes a host FPGA agent 105 coupled to the main compute system 102 via a Type A bus 112; multiple slave FPGA agents 117, 119, and 121 on the subsystems 111, 113, and 115; and multiple Type C links 106, 108, and 110. The Type C links 106, 108, and 110 are all the same type of high-speed serial links that support channel combination and clock recovery, such as Intel's Serial Lite III. Clock recovery provides synchronized clock for connected subsystems such that precise timing information for the distributed computing system can be distributed using GPS signals.

As used herein in this disclosure, the terms "Type A", "Type B", and "Type C" are used to denote different types of bus interface protocols, and are not used to denote particular bus interface protocols. For example, a "Type B" protocol can be any of a number of protocols, including the AXI protocol and Avalon protocol.

To enable data exchanges using the same type of high-speed physical links between the main compute system 102 and the subsystem 111, 113, and 115, a set of Type B bus interfaces 109 are provided on the host FPGA agent 105, each of the Type B bus interfaces 109 corresponding to a Type B interface on one of the subsystems 111, 113, and 115.

For example, the set of Type B bus interfaces 109 can include a bus interface 114, a bus interface 116, and a bus interface 118, which correspond to bus interfaces 123, 127, and 131 respectively. The bus interfaces 114, 116, and 118 and the bus interfaces 123, 127, and 131 are all of the same type. Further, each pair of corresponding bus interfaces (e.g., the bus interfaces 114 and 123, the bus interfaces 116 and 127, and 118 and 131) are of the same version or variation of the same type of protocol.

In an embodiment, each of the slave FPGA agents 117, 119, and 121 can include one or more logic blocks 125, 129, and 133 programmed to perform business logic functions that are specific to that particular subsystem. For example, if a subsystem is a storage device, the one or more logic blocks on that subsystem would be programmed to perform data storage functions.

Thus, the distributed computing system would enable the main compute system 102 and the subsystems 111, 113, and 115 to communicate with each other using the same type of high-speed physical links. Accordingly, the distributed computing system can address the different requirements for bus-based connections on the different subsystems.

Figure 2:
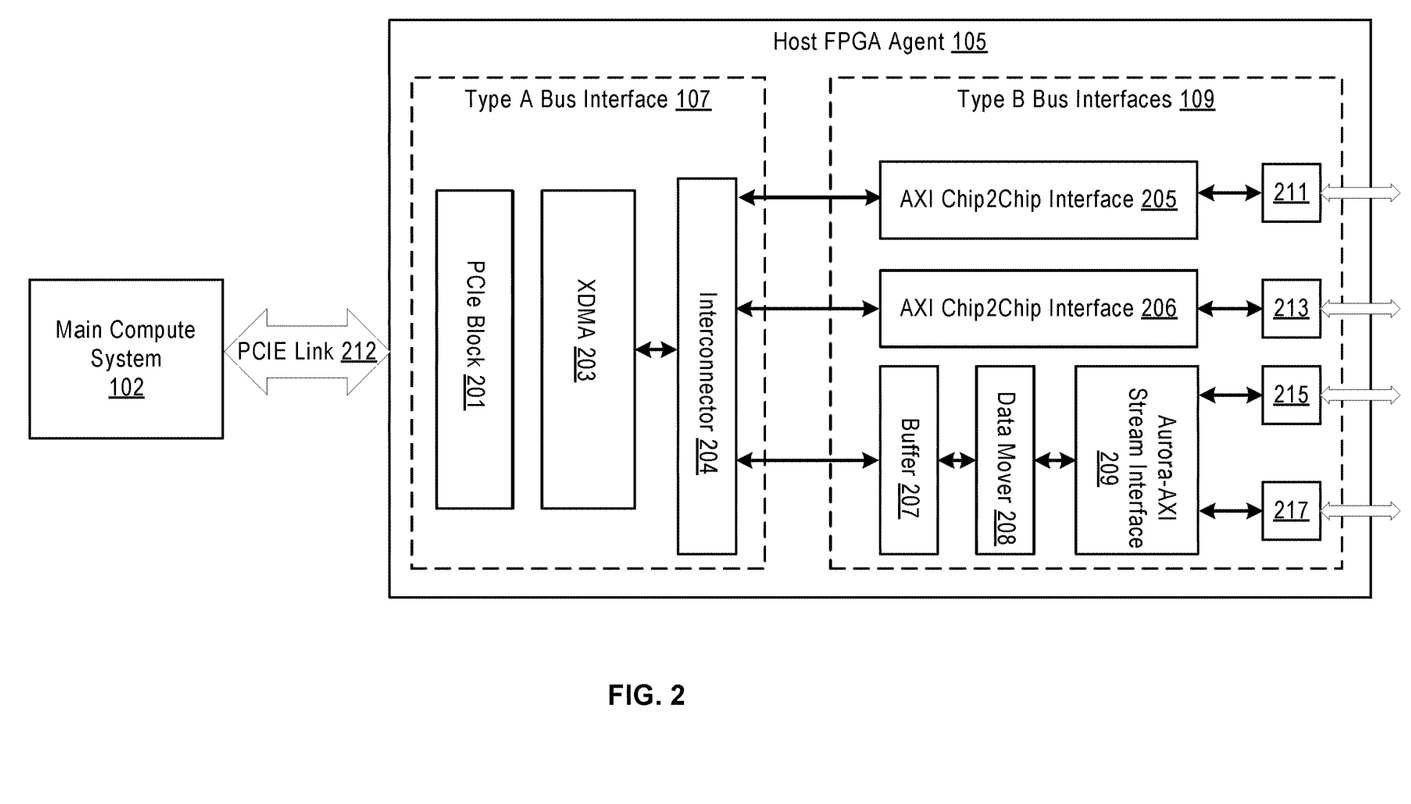
FIG. 2 further illustrates the hose FPGA agent 105 according to an embodiment of the invention.

FIG. 2 further illustrates the host FPGA agent 105 according to an embodiment of the invention. As shown, the host FPGA agent 105 is directly coupled to the main compute system 102 on one side through a high-speed serial PCIe link 212. An integrated PCIE block 201 on the host FPGA agent 105 can function as an endpoint for the PCIe link 212. The PCIE block 201 can be coupled to, or combined with, an external direct memory access (XDMA) 203 to offload data moving tasks from the main compute system 102 to the host FPGA agent 105. In an embodiment, the XDMA 203 can be a wrapper of a PCIe bridge which is used to link devices that use PCIe bus interface to provide PCIe connections.

In an embodiment, the host FPGA agent 105 can include a type B bus interface for each subsystem. Further, each of the Type B bus interface can be a different version/variation of the type B bus interface. For example, when the Type B bus interface is an AXI bus interface, each Type B interface on the host FPGA agent 105 can be a light version of the AXI bus interface, a standard version of the AXI interface, or a stream version of the AXI bus interface.

In an embodiment, the standard version of the AXI interface is a memory-mapping interface that uses memory addresses to access different devices as well as supporting advanced bus features such as burst mode data transaction. When a high-speed data transfer is not needed, a light version of the AXI bus interface (also referred to as "AXI lite") can be used. For example, the AXI lite interface can be used for interfacing with low-speed devices. When stream data such as video or HD audio is transferred from one subsystem to another subsystem at high speed, a steam version of the AXI bus interface (referred to as "AXI stream") can be used.

In an embodiment, the stream interface of the AXI bus interface cannot be used to process address-related bus transactions. Thus, it can be used to transmit data when the data does not need to be stored on disk or accessed from the disk. However, the stream interface of the AXI bus interface is efficient in transmitting large amounts of data. In addition, the light version and the standard version of the AXI bus interface can be converted to the stream version of the AXI bus interface using another version of the AXI interface (e.g., chip2chip bus interface). Multiple AXI streams can be merged and interface high-speed serial links using some standard protocol links such as Aurora.

As shown in the figure, the AXI bus interfaces on the host FPGA agent 105 can include an AXI chip2chip interface 205, an AXI chip2chip interface 206, and an Aurora-AXI stream interface 209. An interconnector 204 can interconnect the different AXI interfaces 205, 206, and 209 with the XDMA 203.

In an embodiment, each of the AXI interfaces 205, 206, and 209 can have a corresponding bus interface that is of the same version/variations of the same type of the bus interface.

In an embodiment, the host FPGA agent 105 includes a buffer 207 and a data mover 208 that are sequentially connected to the Aurora-AXI stream interface 209. The sequence of logic blocks 207, 208, and 209 can be used to transfer video data to the subsystem 115 for compression.

For example, when the ADV 101 is travelling on a road, cameras mounted on the ADV 101 can capture raw video data for the ADV 101 for use in perceiving the surrounding environment. At the same time, the raw video data can be sent by the main compute system 102 via the PCIE link 212 to the host FPGA agent 105, where it is buffered in the buffer logic block 207. Once reaching a predetermined size, the buffered video data can be converted to video streams by the data mover logic block 208, and then transmitted to the subsystem 115 for compression.

As further shown, the host FPGA agent 105 can include multiple high speed serial interfaces 211, 213, 215, and 217 for connecting high-speed serial links to the host FPGA agent 105. Each of the subsystems 111, 113, and 115 can have one or more similar high-speed serial interfaces for connecting the high-speed serial links to the subsystem 111, 113, and 115.

In an embodiment, the interface 211 is for a high-speed serial link connecting the host FPGA 105 and the subsystem 111, the interface 213 is for a high speed serial link connecting the host FPGA 105 and the subsystem 113, and the interfaces 215 and 217 are for high speed serial links connecting the host FPGA 105 and the subsystem 115. The two high speed serial links connected to the interfaces 215 and 217 can be used in parallel to improve data transfer throughput. The stream version of the AXI bus interface supports the use of parallel high-speed links. All the high speed serial links between the host FPGA agent 105 and the subsystems 111, 113, and 115 can be of the same type.

In an embodiment, the host FPGA agent 105 can be integrated with the main compute system 102, or can be designed as an add-on card to be plugged into a host PCIe bus of the main compute system 102. In such as design, the main compute system 102 can serve as an AXI bus base, so the PCIe block 201, the XMDA 203 block and the DMA module that are used to interface with the host FPGA agent 105 can be remove.

Figure 3:
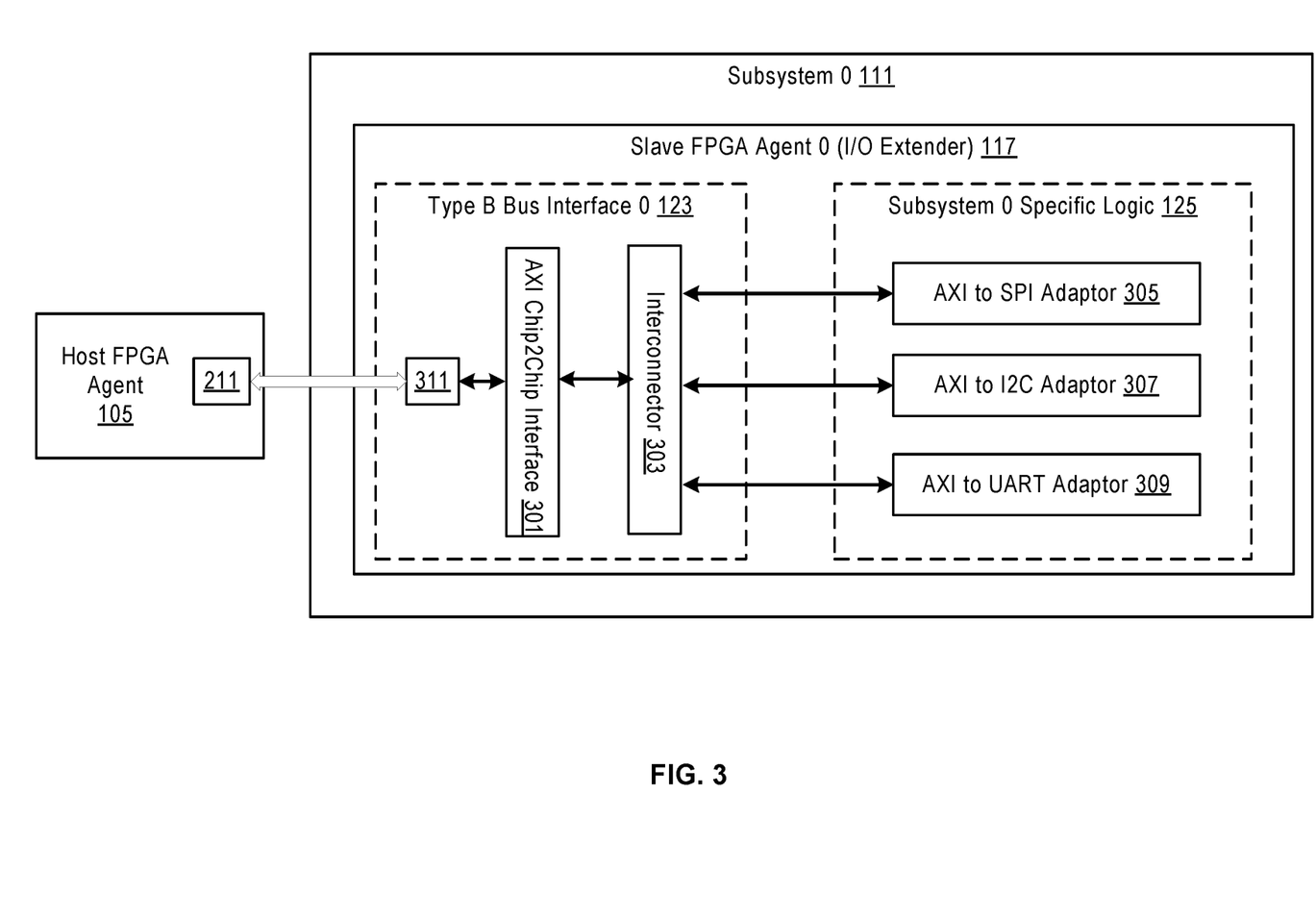
FIG. 3 further illustrates a subsystem according to an embodiment of the invention.

FIG. 3 further illustrates the subsystem 111 according to an embodiment of the invention. The slave FPGA agent 0 117 can be an I/O extender, which extends the subsystem 111 so that it can connect to different types of low-speed I/O devices. One example of the I/O devices is a global positioning system (GPS) device, which generates GPS data, and sends the data to the main compute system 102. Another example of the I/O devices is a device for generating localization data, and yet another example of the I/O differences is a device that receives logging data from the main compute system 102, and stores the logging data.

Each of the low-speed devices may implement a different low-speed bus interface. Examples of the low-speed interfaces include an SPI interface, an I2C interface, and a UART interface. The slave FPGA agent 117 can include multiple logic blocks 305, 307, and 309 that function as protocol adaptors to convert the low-speed bus interfaces to the light versions of the AXI interface. As used herein, a bus interface conversion refers to an operation that converts data packets compatible with a source bus interface to data packets compatible with a destination bus interface.

In an embodiment, although each of the adaptors 305, 307, and 309 can convert a corresponding low-speed bus interface to AXI Lite, the AXI Lite from each adaptor may have one or more format differences, e.g., data width differences. An interconnector 303 can be used to unify the different AXI Lite bus interfaces by removing those differences.

In an embodiment, the slave FPGA agent 117 can further include an AXI chip2chip interface, which corresponds to the AXI chip2chip interface 205 on the host FPGA agent 105. The AXI chip2chip interface is used to convert the light version of the AXI interface generated by the interconnector 303 to the stream version of the AXI interface, which has a better data transfer throughput compared to the light version of the light version of the AXI interface.

The slave FPGA agent 117 enables the different low-speed I/O devices to communicate with the main compute system 102 via the same high-speed serial link connected to a high-speed serial interface 311 on the slave side and to the high speed serial interface 211 on the host side.

In an embodiment, the high-speed serial physical link can be an Aurora link that supports channel combination, and thus only one physical link is needed to connect all the various low-speed devices to the host FPGA agent 105.

Figure 4:
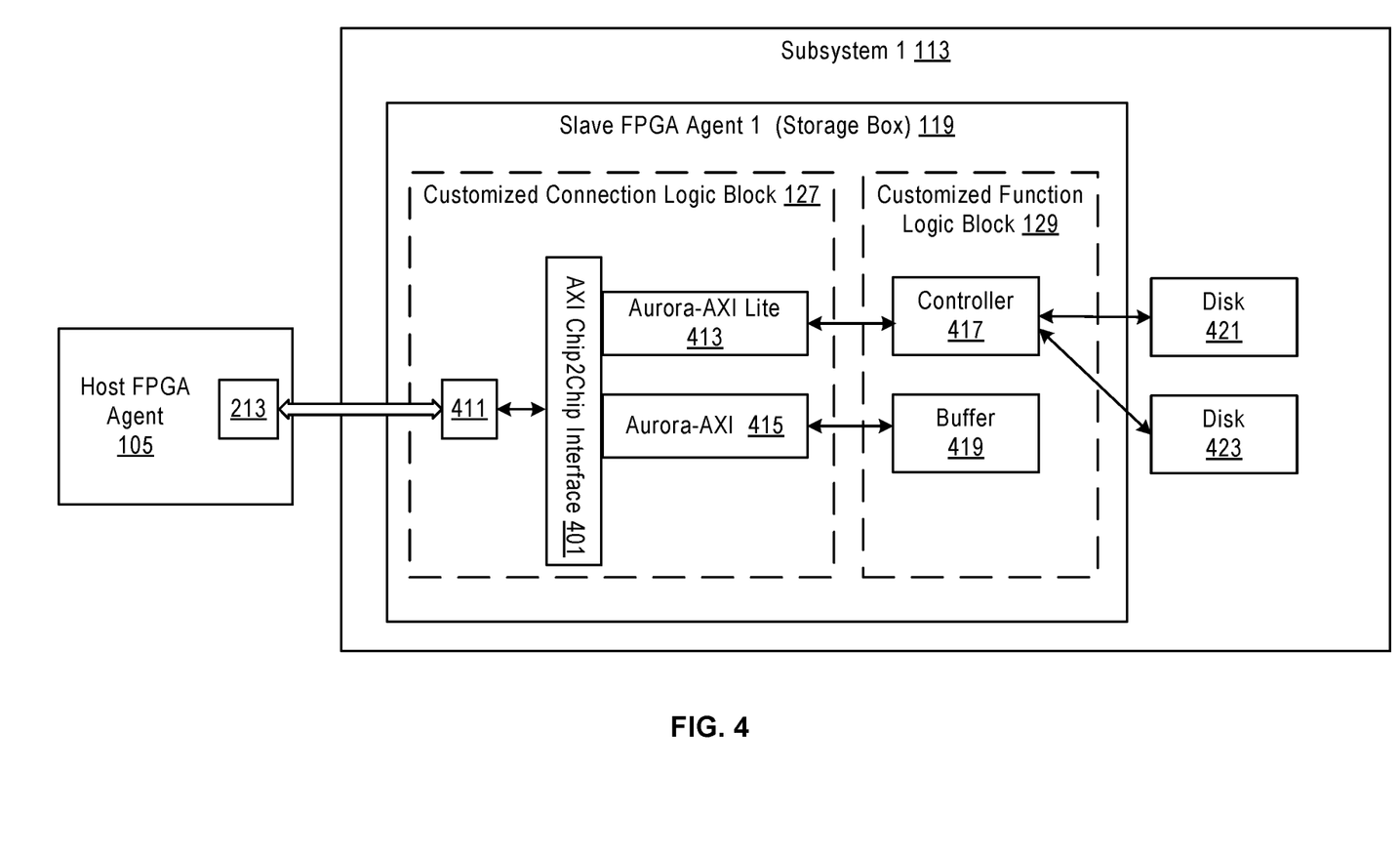
FIG. 4 further illustrates another subsystem according to an embodiment of the invention.

FIG. 4 further illustrates the subsystem 113 according to an embodiment of the invention. In this embodiment, the slave FPGA agent 119 on the subsystem 113 is a storage box, which may receive and store sensor data captured by various sensors (e.g., LiDAR devices, camera devices, and GPS devices) on the ADV 101 as well compressed video data from the subsystem 115. The sensor data can be stored on the cloud, e.g., for offline processing or machine learning model training.

The subsystem 113 needs high data transfer speed and memory-mapped access to the whole storage space. Compare with the subsystem 111, which is an I/O extender, the subsystem 113 needs the full features of the AXI bus interface for data transfer as well as the AXI lite interface to provide a hand-shake channel to the host FPGA agent 105.

As shown in the figure, the slave FPGA agent 119 can include a number of logic blocks to perform various functions. The logic blocks can include a controller block 417 and a buffer block 419. The controller block 417 can be programmed to perform tasks such as monitoring the health (e.g., available storage space) of the storage box and file management. Since these administrative tasks do not require a large amount of data transfer between the main compute system 102 and the subsystem 113, the AXI Lite bus interface (i.e., Aurora-AXI Lite 413) can be used. In the meanwhile, large amounts of sensor data from the main compute system 102 needs to be transmitted to the storage box, and thus the standard AXI interface (i.e., Aurora-AXI 415) is also used. Data from the main compute system 102 can first be buffered in the buffer logic block 419, which can bridge the differences between a data transfer speed from the main compute system 102 and a disk writing speed to one of the two disk blocks 421 and 423.

In an embodiment, the two AXI bus interfaces 413 and 415 can be coupled to the AXI chip2chip interface 401, which corresponds to the AXI chip2chip2 interface on the host FPGA agent 206. The AXI chip2chip interface 401 can be used to convert the light version and the standard version into the stream version of the AXI interface to improve the data transfer throughput between the host FPGA agent 105 and the slave FPGA agent 119.

Figure 5:
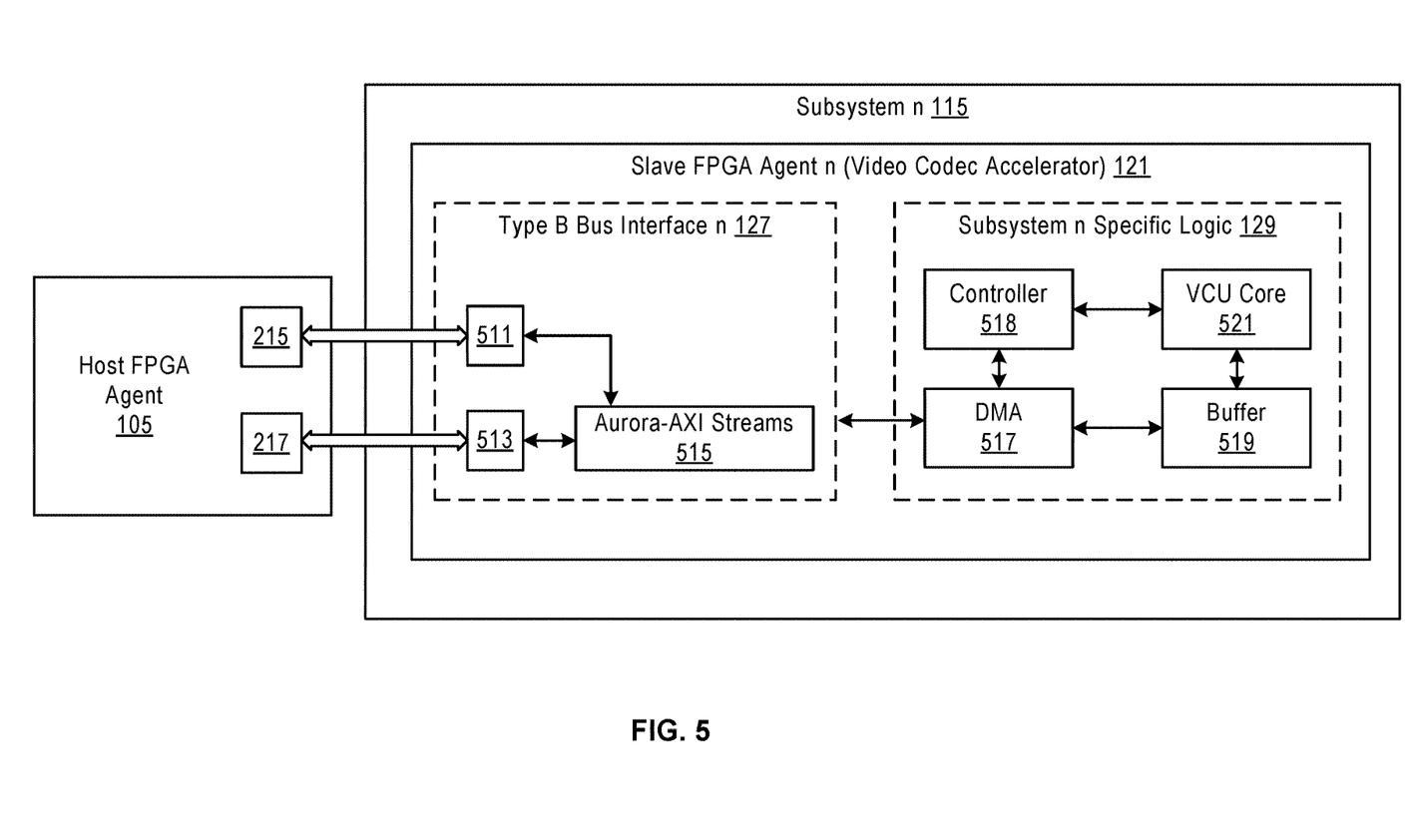
FIG. 5 further illustrates another subsystem according to an embodiment of the invention.

FIG. 5 further illustrates the subsystem 115 according to an embodiment of the invention. In this embodiment, the subsystem 115 is a video codec accelerator, and the slave FPGA agent 121 on the subsystem is programmed to establish and maintain data connection with the host FPGA 105 such that video streams can be exchanged between the main compute system 102 and the subsystem 115 with high efficiency and low latency.

In an embodiment, multiple high speed serial links can be used between the host FPGA 105 the subsystem, and two high speed serial interfaces 511 and 513 are provided for those high speed serial links on the slave side. The Aurora-AXI streams interface 515 is used for transmitting stream data, which does not to be stored on the subsystem 115 and thus does not need memory-mapping.

In an embodiment, video streams from the main compute system 102 can be transmitted to the subsystem 115 via the Aurora-AXI streams interface 515. The slave FPGA agent 121 can include multiple logic blocks, 517, 518, 519, and 521 for managing the data transmission and compression. The direct memory access (DMA) logic block 517 block can move data from the Aurora-AXI streams interface 515 to the buffer 519 under the instruction and control of the controller 518, which further instructs the video codec unit (VCU) core 521 to obtain the video streams from the buffer 519 and compress the video streams.

After the compression of raw video data of a predetermined size (e.g., the size of the buffer) is completed, the controller 518 can put the compressed video streams back to the buffer 519. The DMA 517 can then be instructed the host FPGA agent 105 to obtain the compressed video data, and send the compressed video data to the subsystem 113 for storage.

Figure 6:
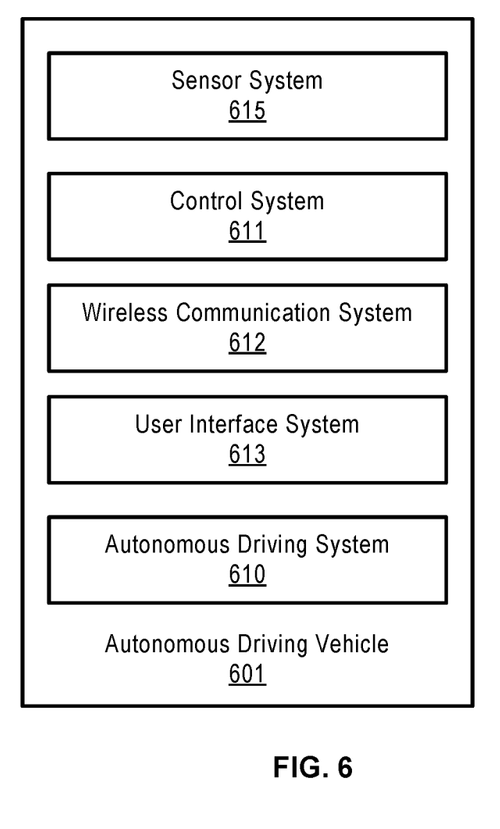
FIG. 6 is a block diagram illustrating an autonomous driving vehicle according to an embodiment of the invention.

FIG. 6 is a block diagram illustrating an autonomous driving vehicle according to an embodiment of the invention. Referring to FIG. 6, autonomous driving vehicle 601 (the same ADV as ADV 101 in FIG. 1) may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to drive in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, autonomous driving system (ADS) 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or ADS 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
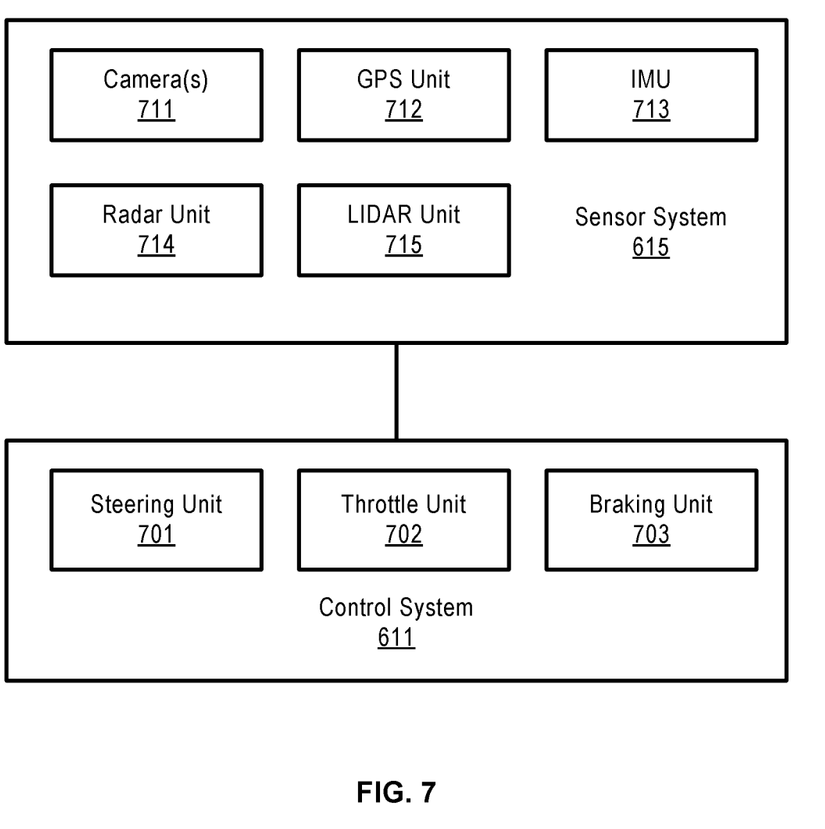
FIG. 7 is a block diagram illustrating an autonomous driving vehicle according to an embodiment of the invention.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by ADS 610, especially when operating in an autonomous driving mode. ADS 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, ADS 610 may be integrated with vehicle control system 611.

For example, a user as a passenger may specify a starting location and a destination of a trip, for example, via a user interface. ADS 610 obtains the trip related data. For example, ADS 610 may obtain location and route data from an MPOI server. The location server provides location services and the MPOI server provides map services and the POIs of certain locations. Alternatively, such location and MPOI information may be cached locally in a persistent storage device of ADS 610.

While autonomous driving vehicle 601 is moving along the route, ADS 610 may also obtain real-time traffic information from a traffic information system or server (TIS). Note that the servers may be operated by a third-party entity. Alternatively, the functionalities of the servers may be integrated with ADS 610. Based on the real-time traffic information, MPOI information, and location information, as well as real-time local environment data detected or sensed by sensor system 615 (e.g., obstacles, objects, nearby vehicles), ADS 610 can plan an optimal route and drive vehicle 601, for example, via control system 611, according to the planned route to reach the specified destination safely and efficiently.

Figure 8:
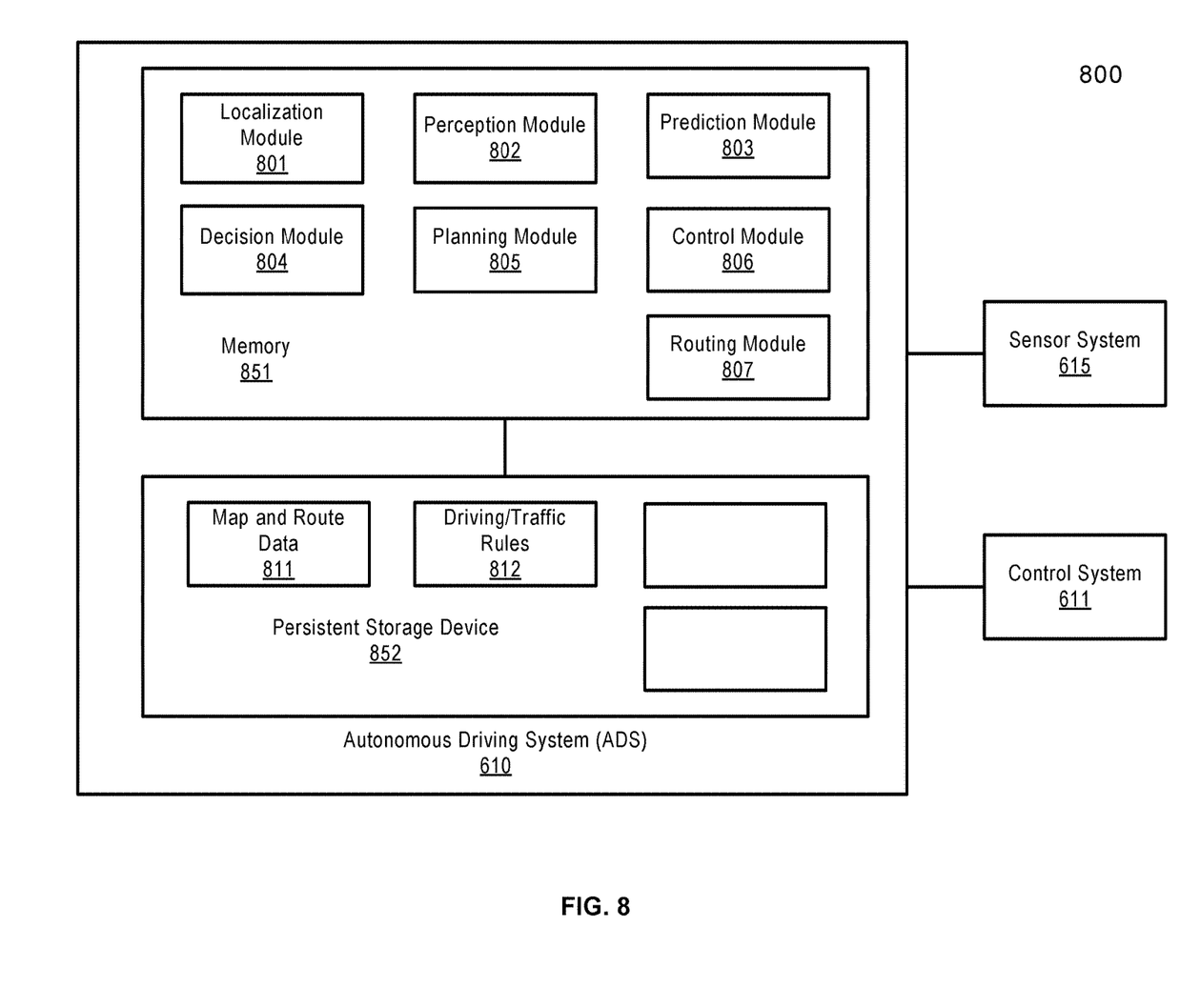
FIG. 8 is a block diagram illustrating an example of an autonomous driving system used with an autonomous driving vehicle according to one embodiment.

FIG. 8 is a block diagram illustrating an example of an autonomous driving system used with an autonomous driving vehicle according to one embodiment. System 800 may be implemented as a part of autonomous driving vehicle 601 of FIG. 6. Referring to FIG. 8, ADS 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 601 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 601, such as map and route data 811, to obtain the trip related data. For example, localization module 801 may obtain location and route data from a location server and a map and POI (MPOI) server. A location server provides location services and an MPOI server provides map services and the POIs of certain locations, which may be cached as part of map and route data 811. While autonomous driving vehicle 601 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 705 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 601 would move in a next moving cycle (e.g., next route/path segment). For example, the planning and control data may instruct vehicle 601 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 613. The PNC layer may include functionalities of at least planning module 805 and control module 806. The perception layer may include functionalities of at least perception module 802. In one embodiment, there is an additional layer including the functionalities of prediction module 803 and/or decision module 804. Alternatively, such functionalities may be included in the PNC layer and/or the perception layer. The firmware layer may represent at least the functionality of sensor system 615, which may be implemented in a form of a field programmable gate array (FPGA). The hardware layer may represent the hardware of the autonomous driving vehicle such as control system 611. The application layer, PNC layer, and perception layer can communicate with the firmware layer and hardware layer via the device driver layer.

Figure 9A:
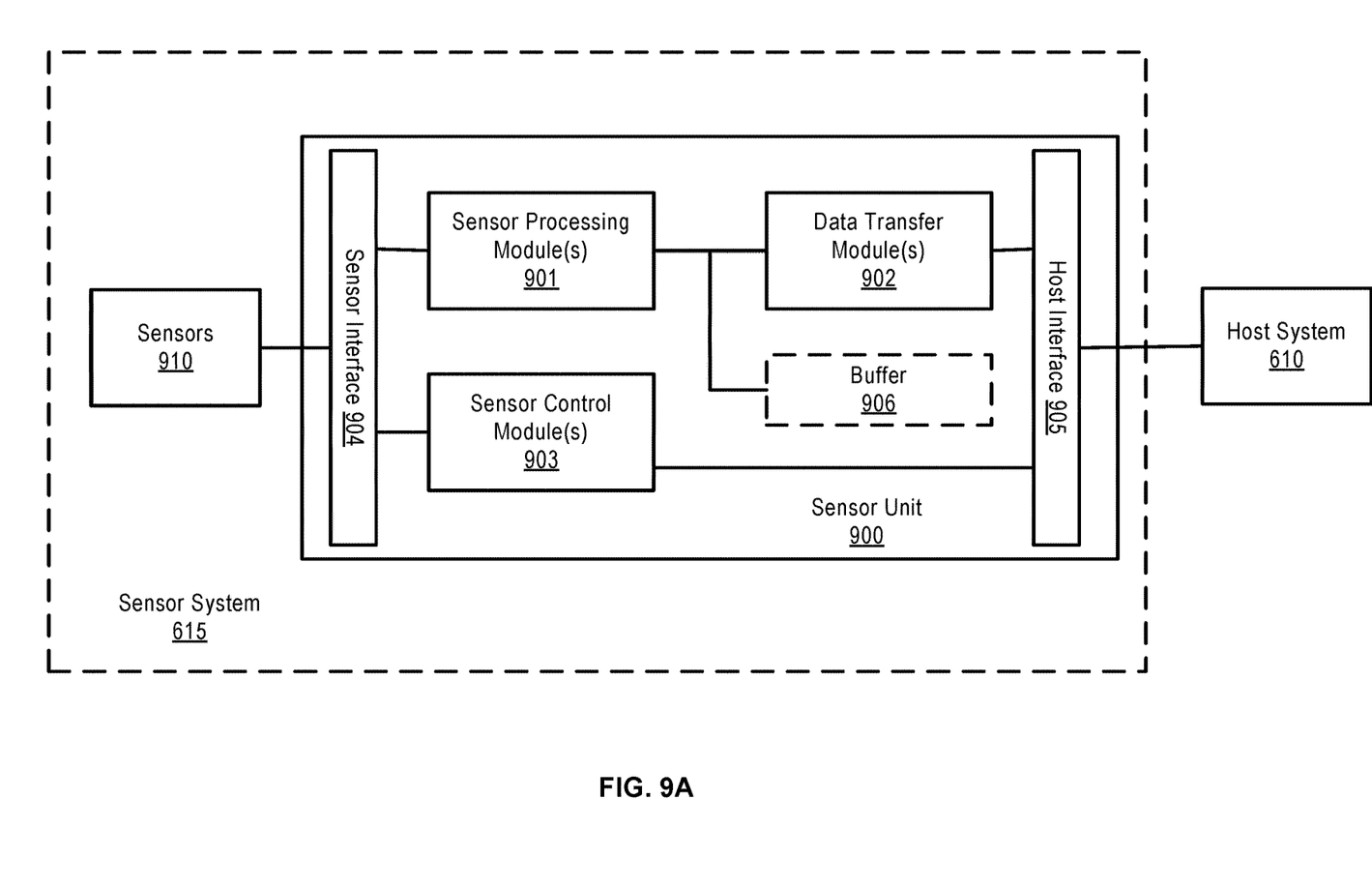
FIGS. 9A and 9B are block diagrams illustrating an example of a sensor unit according to one embodiment.

FIG. 9A is a block diagram illustrating an example of a sensor system according to one embodiment of the invention. Referring to FIG. 9A, sensor system 615 includes a number of sensors 910 and a sensor unit 900 coupled to host system 610 (i.e., ADS 610). Host system 610 represents a planning and control system as described above, which may include at least some of the modules as shown in FIG. 7. Sensor unit 900 may be implemented in a form of an FPGA device or an ASIC (application specific integrated circuit) device. In one embodiment, sensor unit 900 includes, amongst others, one or more sensor data processing modules 901 (also simply referred to as sensor processing modules), data transfer modules 902, and sensor control modules or logic 903. Modules 901-903 can communicate with sensors 910 via a sensor interface 904 and communicate with host system 610 via host interface 905. Optionally, an internal or external buffer 906 may be utilized for buffering the data for processing.

In one embodiment, for the receiving path or upstream direction, sensor processing module 901 is configured to receive sensor data from a sensor via sensor interface 904 and process the sensor data (e.g., format conversion, error checking), which may be temporarily stored in buffer 906. Data transfer module 902 is configured to transfer the processed data to host system 610 using a communication protocol compatible with host interface 905. Similarly, for the transmitting path or downstream direction, data transfer module 902 is configured to receive data or commands from host system 610. The data is then processed by sensor processing module 901 to a format that is compatible with the corresponding sensor. The processed data is then transmitted to the sensor.

In one embodiment, sensor control module or logic 903 is configured to control certain operations of sensors 910, such as, for example, timing of activation of capturing sensor data, in response to commands received from host system (e.g., perception module 702) via host interface 905. Host system 610 can configure sensors 910 to capture sensor data in a collaborative and/or synchronized manner, such that the sensor data can be utilized to perceive a driving environment surrounding the vehicle at any point in time.

Sensor interface 904 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general-purpose input/output (GPIO) interfaces. Host interface 905 may be any high speed or high bandwidth interface such as PCIe (peripheral component interconnect or PCI express) interface. Sensors 910 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 900. The serial interface such as UART can be coupled with a console system for debug purposes.

Note that sensors 910 can be any kind of sensors and provided by various vendors or suppliers. Sensor processing module 901 is configured to handle different types of sensors and their respective data formats and communication protocols. According to one embodiment, each of sensors 910 is associated with a specific channel for processing sensor data and transferring the processed sensor data between host system 610 and the corresponding sensor. Each channel includes a specific sensor processing module and a specific data transfer module that have been configured or programmed to handle the corresponding sensor data and protocol, as shown in FIG. 9B.

Figure 9B:
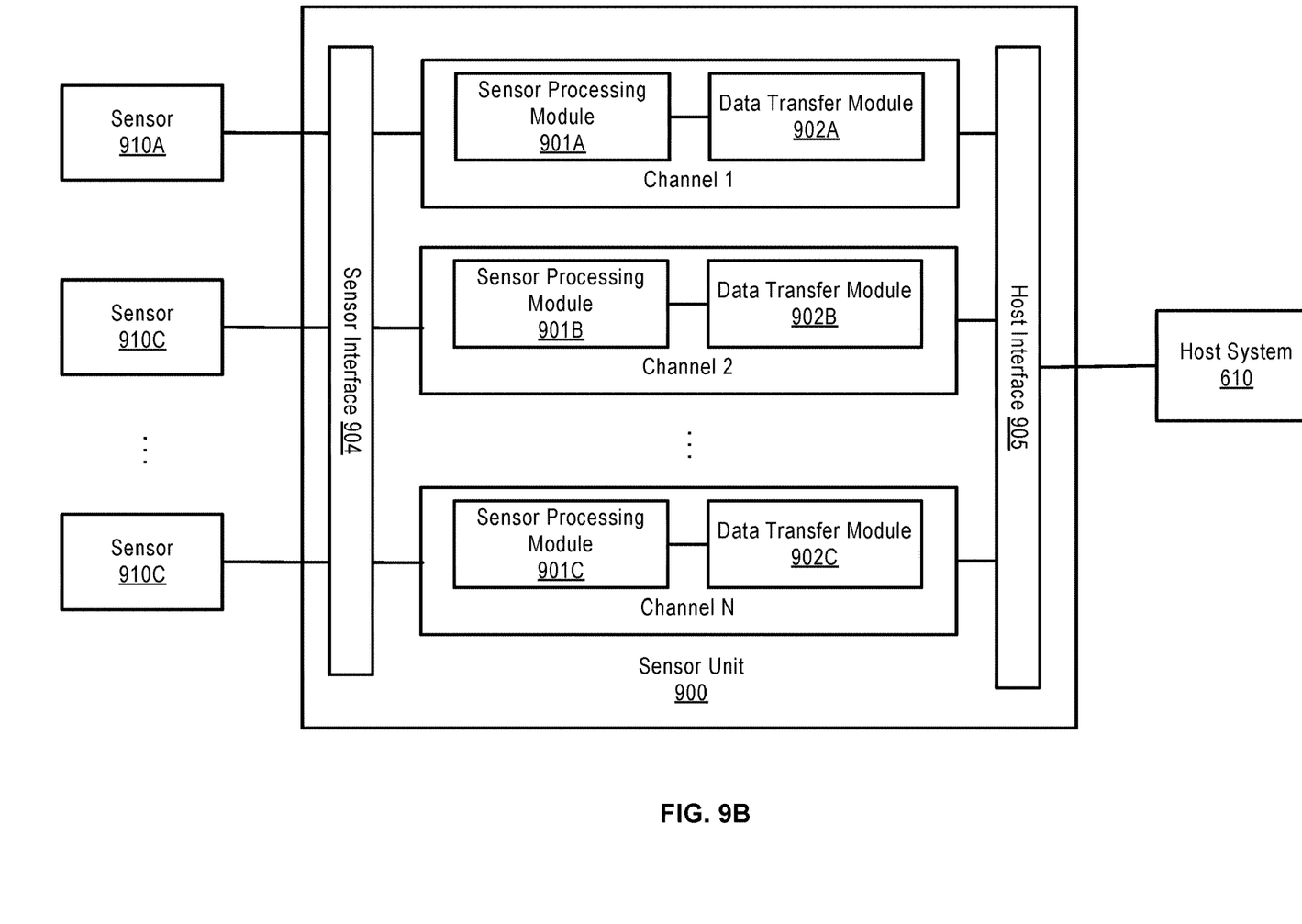

Referring now to FIG. 9B, sensor processing modules 901A-901C are specifically configured to process sensor data obtained from sensors 910A-910C respectively. Note that sensors 910A-910C may the same or different types of sensors. Sensor processing modules 901A-901C can be configured (e.g., software configurable) to handle different sensor processes for different types of sensors. For example, if sensor 910A is a camera, processing module 901A can be figured to handle pixel processing operations on the specific pixel data representing an image captured by camera 910A. Similarly, if sensor 910A is a LIDAR device, processing module 901A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 902A-902C can be configured to operate in different modes, as different kinds of sensor data may be in different size or sensitivities that require different speed or timing requirement. According to one embodiment, each of data transfer modules 902A-902C can be configured to operate in one of a low latency mode, a high bandwidth mode, and a memory mode (also referred to as a fixed memory mode).

When operating in a low latency mode, according to one embodiment, a data transfer module (e.g., data transfer module 902) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 902) is configured to accumulate the sensor data received from a sensor up to a predetermined amount, but is still within the bandwidth the connection between the data transfer module and the host system 610. The accumulated sensor data is then transferred to the host system 610 in a batch that maximum the bandwidth of the connection between the data transfer module and host system 610. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 610, similar to a shared memory page. Examples of the sensor data to be transferred using memory mode include system status data such as temperature, fans speed, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A distributed computing system in an autonomous driving vehicle (ADV), comprising:
   a host field programmable gate array (FPGA) agent coupled to a main compute system through a high-speed serial bus link of a third type;
   a plurality of slave FPGA agents, wherein each of the plurality of FPGA agents resides on one of a plurality of subsystems;
   a plurality of pairs of bus interfaces, wherein each bus interface of the plurality of pairs of bus interfaces is of a first type, wherein a first bus interface of each pair of the plurality of pairs of bus interfaces resides on the host FPGA agent, and a second bus interface of the pair of bus interface resides on one of the plurality of slave FPGA agents;
   wherein each of the plurality of slave FPGA agents includes one or more logic blocks programmed to perform one or customized functions, and is linked to the host FPGA agent via a physical serial link of a second type to exchange data between the host FPGA agent and each of the plurality of slave FPGA agents and wherein the host FPGA agent further includes a logic block that is configured to connect to the high-speed serial bus link of the third type and offload data-moving tasks from the main compute system to the host FPGA agent.

2. The distributed computing system of claim 1, wherein the bus interface of the first type is one of an advanced extensible interface (AXI) or an Avalon interface.

3. The distributed computing system of claim 1, wherein the physical serial link of the second type is one of a high-speed cable or a high-speed fiber link.

4. The distributed computing system of claim 1, wherein the physical serial link implements one of a plurality of high-speed serial link protocols, wherein each of the plurality of high-speed serial link protocols supports channel combination and clock recovery.

5. The distributed computing system of claim 1, wherein the high-speed serial bus link of the third type is a peripheral component interconnect express (PCIe) link.

6. The distributed computing system of claim 5, wherein the logic block of the host FPGA agent is configured to connect to the PCIe link and coupled to a PCIe bridge wrapper to offload the data-moving tasks from the main compute system to the host FPGA agent.

7. The distributed computing system of claim 6, wherein the host FPGA agent further includes an interconnector that bridges the plurality of first bus interfaces of the plurality of pairs of bus interfaces and the PCIe bridge wrapper.

8. The distributed computing system of claim 1, wherein the slave FPGA agent on a first subsystem of the plurality of subsystems is an Input/Output (I/O) extender, which is connected to a plurality of low-speed devices with different types of low-speed bus interfaces.

9. The distributed computing system of claim 8, wherein the different types of low-speed bus interfaces include a serial peripheral interface (SPI) bus interface, an inter-integrated circuit (I2C) bus interface, and a universal asynchronous receiver-transmitter (UART) bus interface.

10. The distributed computing system of claim 9, wherein the I/O extender includes a plurality of bus interface adaptors programmed to adapt the different types of low-speed bus interfaces to a light version of the bus interface of the first type.

11. The distributed computing system of claim 9, wherein the I/O extender further includes an interconnector that converts each light version of the bus interface of the first type into the second bus interface of the pair of bus interfaces corresponding to the I/O extender.

12. The distributed computing system of claim 1, wherein the slave FPGA agent on a second subsystem of the plurality of subsystems is a storage box, which includes a light version of the bus interface of the first type and a standard version of the bus interface of the first type, wherein each of the light version and the standard version is converted to the second bus interface of the pair of bus interfaces corresponding to the storage box.

13. The distributed computing system of claim 12, wherein the light version of the bus interface of the first type is to transmit control data, and the standard version of the bus interface of the first type is to transmit compressed video data.

14. The distributed computing system of claim 1, wherein the slave FPGA agent on a third subsystem of the plurality of subsystems is a video codec accelerator, which includes a stream bus interface of the bus interface of the first type.

15. The distributed computing system of claim 14, wherein the stream bus interface support parallel high-speed physical serial link of the second type.

16. An autonomous driving vehicle (ADV), comprising:
a distributed computing system that comprises:
a host field programmable gate array (FPGA) agent coupled to a main compute system;
a plurality of slave FPGA agents, wherein each of the plurality of FPGA agents resides on one of a plurality of subsystems;
a plurality of pairs of bus interfaces, wherein each bus interface of the plurality of pairs of bus interfaces is of a first type, wherein a first bus interface of each pair of the plurality of pairs of bus interfaces resides on the host FPGA agent, and a second bus interface of the pair of bus interface resides on one of the plurality of slave FPGA agents;
wherein each of the plurality of slave FPGA agents includes one or more logic blocks programmed to perform one or customized functions, and is linked to the host FPGA agent via a physical serial link of a second type to exchange data between the host FPGA agent and each of the plurality of slave FPGA agents, and wherein the slave FPGA agent on a first subsystem of the plurality of subsystems is an Input/Output (I/O) extender, which is connected to a plurality of low-speed devices with different types of low-speed bus interfaces, and wherein the different types of low-speed bus interfaces include a serial peripheral interface (SPI) bus interface, an inter-integrated circuit (I2C) bus interface, and a universal asynchronous receiver-transmitter (UART) bus interface, and wherein the I/O extender includes a plurality of bus interface adaptors programmed to adapt the different types of low-speed bus interfaces to a light version of the bus interface of the first type.

17. The ADV of claim 16, wherein the bus interface of the first type is one of an advanced extensible interface (AXI) or an Avalon interface.

18. The ADV of claim 16, wherein the physical serial link of the second type is one of a high-speed cable or a high-speed fiber link.

19. The ADV of claim 16, wherein the physical serial link implements one of a plurality of high-speed serial link protocols, wherein each of the plurality of high-speed serial link protocols supports channel combination and clock recovery.

20. A distributed computing system in an autonomous driving vehicle (ADV), comprising:
a host field programmable gate array (FPGA) agent coupled to a main compute system through a high-speed serial bus link of a third type;
a plurality of slave FPGA agents, wherein each of the plurality of FPGA agents resides on one of a plurality of subsystems;
a plurality of pairs of bus interfaces, wherein each bus interface of the plurality of pairs of bus interfaces is of a first type, wherein a first bus interface of each pair of the plurality of pairs of bus interfaces resides on the host FPGA agent, and a second bus interface of the pair of bus interface resides on one of the plurality of slave FPGA agents;
wherein each of the plurality of slave FPGA agents includes one or more logic blocks programmed to perform one or customized functions, and is linked to the host FPGA agent via a physical serial link of a second type to exchange data between the host FPGA agent and each of the plurality of slave FPGA agents and wherein the host FPGA agent further includes a logic block that is configured to connect to the high-speed serial bus link of the third type and offload data-moving tasks from the main compute system to the host FPGA agent, and wherein the slave FPGA agent on a second subsystem of the plurality of subsystems is a storage box, which includes a light version of the bus interface of the first type and a standard version of the bus interface of the first type, wherein each of the light version and the standard version is converted to the second bus interface of the pair of bus interfaces corresponding to the storage box.

* * * * *